United States Patent [19]
SanGregory

[11] Patent Number: 5,926,654
[45] Date of Patent: Jul. 20, 1999

[54] CAMERA FRAME ASSEMBLY HAVING A BAFFLED SUPPLY CHAMBER AND FILM LOADING APPARATUS AND METHOD

[75] Inventor: Jude A. SanGregory, Spencerport, N.Y.

[73] Assignee: Eastman Kodak Company, Rochester, N.Y.

[21] Appl. No.: 09/031,878

[22] Filed: Feb. 27, 1998

[51] Int. Cl.⁶ .................................................. G03B 17/02
[52] U.S. Cl. .................. 396/6; 396/538; 53/116; 53/430
[58] Field of Search ................ 396/6, 535, 538; 242/335, 348, 539, 548, 548.3; 53/118, 430, 116

[56] References Cited

U.S. PATENT DOCUMENTS

| | | |
|---|---|---|
| 651,118 | 6/1900 | Pascal et al. . |
| 1,921,559 | 8/1933 | Case . |
| 1,921,560 | 12/1933 | Case . |
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Eagelsmann et al. . |
| 3,643,889 | 2/1972 | Krause . |
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |
| 4,687,311 | 8/1987 | Malloy Desormeaux . |
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei et al. . |
| 5,125,630 | 6/1992 | Hoyt et al. . |
| 5,131,592 | 7/1992 | Shibata et al. . |

(List continued on next page.)

FOREIGN PATENT DOCUMENTS

| | | |
|---|---|---|
| 0743546A1 | 11/1996 | European Pat. Off. . |
| 0750216A1 | 12/1996 | European Pat. Off. . |
| 38-20424 | 10/1963 | Japan . |
| 63-271325 | 11/1988 | Japan . |
| 2-52341 | 2/1990 | Japan . |
| 3-2741 | 1/1991 | Japan . |
| 3-2751 | 1/1991 | Japan . |
| 3-2752 | 1/1991 | Japan . |
| 5-134361 | 5/1993 | Japan . |
| 5-32317 | 12/1993 | Japan . |

(List continued on next page.)

*Primary Examiner*—Howard B. Blankenship
*Attorney, Agent, or Firm*—Robert Luke Walker

[57] ABSTRACT

Photographic film loading method and apparatus and a camera frame assembly having an internally baffled supply chamber. In the method, a guide is interposed in the chamber and a leading portion of the filmstrip is transported into the chamber. The filmstrip is then coiled within the chamber, between the guide and the baffle to form a film roll. During the coiling, an internal diameter of the film roll is maintained constant. The guide is withdrawn and the baffle is retained within the chamber with the film roll.

23 Claims, 13 Drawing Sheets

U.S. PATENT DOCUMENTS

| | | |
|---|---|---|
| 5,257,748 | 11/1993 | Morizzo . |
| 5,301,892 | 4/1994 | Merz et al. . |
| 5,311,231 | 5/1994 | Suzuki et al. . |
| 5,544,833 | 8/1996 | Zander . |
| 5,608,482 | 3/1997 | Watkins et al. . |
| 5,659,802 | 8/1997 | Watkins et al. . |
| 5,689,733 | 11/1997 | Zawodny et al. . |
| 5,745,797 | 4/1998 | Watkins et al. . |

FOREIGN PATENT DOCUMENTS

| | | |
|---|---|---|
| 6-130568 | 5/1994 | Japan . |
| 6-289541 | 10/1994 | Japan . |
| 6-295020 | 10/1994 | Japan . |
| 6-295022 | 10/1994 | Japan . |
| 6-332118 | 12/1994 | Japan . |
| 7-13279 | 1/1995 | Japan . |
| 7-5526 | 1/1995 | Japan . |
| 7-209721 | 8/1995 | Japan . |
| 7-219157 | 8/1995 | Japan . |
| 8-171180 | 7/1996 | Japan . |
| 8-171181 | 7/1996 | Japan . |
| 9-211796 | 8/1996 | Japan . |
| 8-262633 | 10/1996 | Japan . |
| 8-262636 | 10/1996 | Japan . |
| 8-262647 | 10/1996 | Japan . |
| 8-286324 | 11/1996 | Japan . |
| 8-314071 | 11/1996 | Japan . |
| 9-43777 | 2/1997 | Japan . |
| 9-43778 | 2/1997 | Japan . |
| 9-43779 | 2/1997 | Japan . |
| 558515 | 1/1944 | United Kingdom . |
| 1060937 | 3/1967 | United Kingdom . |

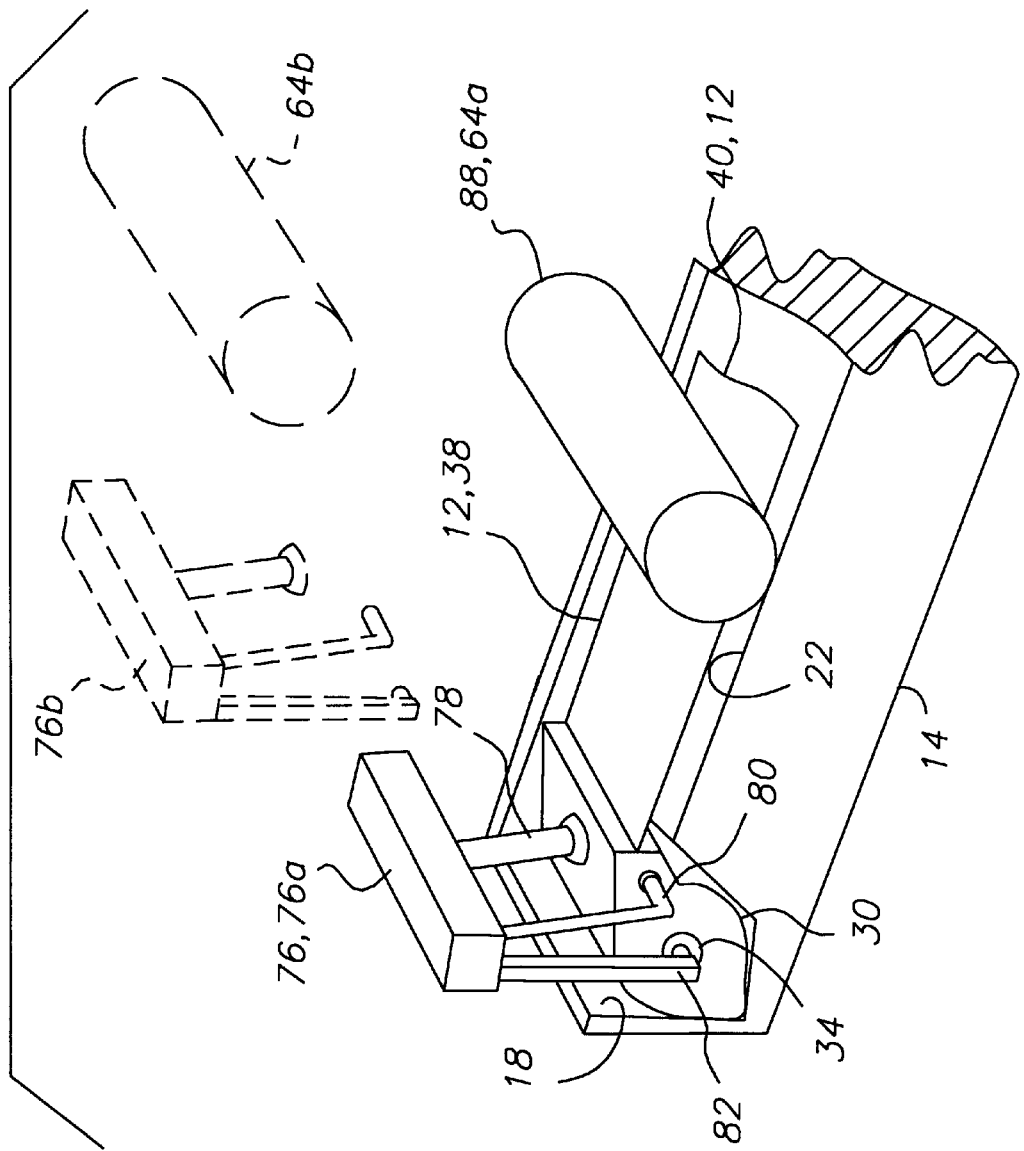

CAMERA FRAME ASSEMBLY HAVING A BAFFLED SUPPLY CHAMBER AND FILM LOADING APPARATUS AND METHOD

CROSS REFERENCE TO RELATED APPLICATIONS

U.S. Ser. No. 08/881,164, filed Jun. 24, 1997, entitled "Film Loading Methods and Apparatus Using an Overstressed Scroll Former and Film Housings," by Dennis R. Zander; U.S. Ser. No. 08/881,169, filed Jun. 24, 1997, entitled "Advancing Sheath Film Loader, Method of Film Loading and Camera Frame Assembly," by Dennis R. Zander; U.S. Ser. No. 08/866,867, filed May 30, 1997, entitled "Three Roller Film Winder and Method," by Joseph A. Watkins, Dennis R. Zander and Matthew Stanzione; U.S. Ser. No. 08/866,866, filed Aug. 22, 1996, entitled "Two Roller Film Scroller and Method," by Joseph Yokajty, Matthew Stanzione and Joseph A. Watkins; U.S. Ser. No. 08/848,443, filed Apr. 26, 1996, entitled "Film Scrolling Method, Apparatus and Camera," by Michael L. DeCessa; U.S. Ser. No. 08/837,632, filed April 14, 1997, entitled "Method and Apparatus for Loading a Cartridge in a Camera Frame Assembly," by Stephen D. Marra, Duane B. Kirk and Joseph A. Watkins; U.S. Serial No. 08/840,482, filed Jan. 9, 1997, entitled "Camera Assembly Methods and Apparatus," by Joseph A. Watkins, Jude A. Sangregory, Duane B. Kirk and Mark D. Marlock.

FIELD OF THE INVENTION

The invention relates to photography and photographic equipment and more particularly relates to a camera frame assembly having a baffled supply chamber and film loading apparatus and methods.

BACKGROUND OF THE INVENTION

A wide variety of cameras, film cassettes, bulk film containers and the like store a long, relatively narrow filmstrip as a cylindrical film roll. (The terms "film" and "filmstrip" are used herein to refer to the same physical article. "Film" is used as the more general term. "Filmstrip" is used where it is desired to emphasize that the film, when unrolled, has the form of a long, narrow rectangle. The term "film supply" is used to refer to the camera, cassette, or container that holds the filmstrip. The roll of film is, in many cases, wound around a central spool or core. In other cases, the core is deleted in an effort to reduce expense, complexity, and weight and the film is in the form of a coreless roll or "scroll".

Scrolls can be formed by simply transporting a filmstrip into a cylindrical or similarly shaped storage container or camera film chamber. For example, a variety of cameras are known in which a film scroll is formed by prewinding unexposed film from a cartridge or spool. U.S. Pat. No. 1,921,559 and U.S. Pat. No. 1,921,560 teach thrust cartridge cameras which prewind to an empty scroll chamber having generally concave walls. This approach has the advantage that handling of the scroll is minimized, since the scroll is formed in situ. This approach has the problem that it tends to require the use of a filmstrip having specific curling properties and becomes problematic when the length of the filmstrip is increased.

A solution to this problem is using an appliance to help shape the scroll as it is formed. Scroll forming methods using appliances can be roughly categorized into methods using appliances acting external to the scroll, methods using appliances acting internal to the scroll, and methods using a combination of internal and external appliances. External-acting appliances have the advantage that the film does not need to be attached to the appliance during film scrolling. The following references teach methods and apparatus in which an external-acting appliance is used.

U.S. Pat. No. 3,057,573 teaches a camera having scroll chamber defined by three opposed rollers, which resiliently move apart as the scroll diameter is increased. One of the rollers is fixed. The other two are mounted in a movable carrier. U.S. Pat. No. 4,440,483 teaches a camera having a scroll chamber defined by curved walls and an arcuate lever. The lever is spring biased to bear against a film scroll within the chamber. U.S. Pat. No. 3,288,389 teaches the formation of a scroll in a film cartridge within a resilient band of rubber of the like. The band may be lined by foil or other flexible material. U.S. Pat. No. 2,484,248 teaches a similar cartridge having a metal spring. In each of these approaches, the film scroll is subject to the compressive force of the springs or resilient band during film use. This compressive force is undesirable, since it puts the scrolled filmstrip at risk of scratching.

U.S. Pat. No. 5,016,833 teaches a document roll-up system in which media sheets are rolled in a space defined by a pair of external guides and a "C ring". After the document has been rolled, the C ring springs out to its normal configuration. With this approach compressive force is reduced after winding; but scuffing could result due to clockspringing.

It would thus be desirable to provide a camera having a baffled supply chamber and film loading apparatus and methods in which external acting structures control film roll size throughout film winding.

SUMMARY OF THE INVENTION

The invention is defined by the claims. The invention, in its broader aspects, provides a photographic film loading method and apparatus and a camera having an internally baffled supply chamber. In the method, a guide is interposed in the chamber and a leading portion of the filmstrip is transported into the chamber. The filmstrip is then coiled within the chamber, between the guide and the baffle to form a film roll. During the coiling, an internal diameter of the film roll is maintained constant. The guide is withdrawn and the baffle is retained within the chamber with the film roll.

It is an advantageous effect of at least some of the embodiments of the invention that a camera having a baffled supply chamber and film loading apparatus and methods are provided in which external acting structures control film roll size throughout film winding.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

2. The positioner of the apparatus is also shown, in diagrammatical form.

Figure 3:
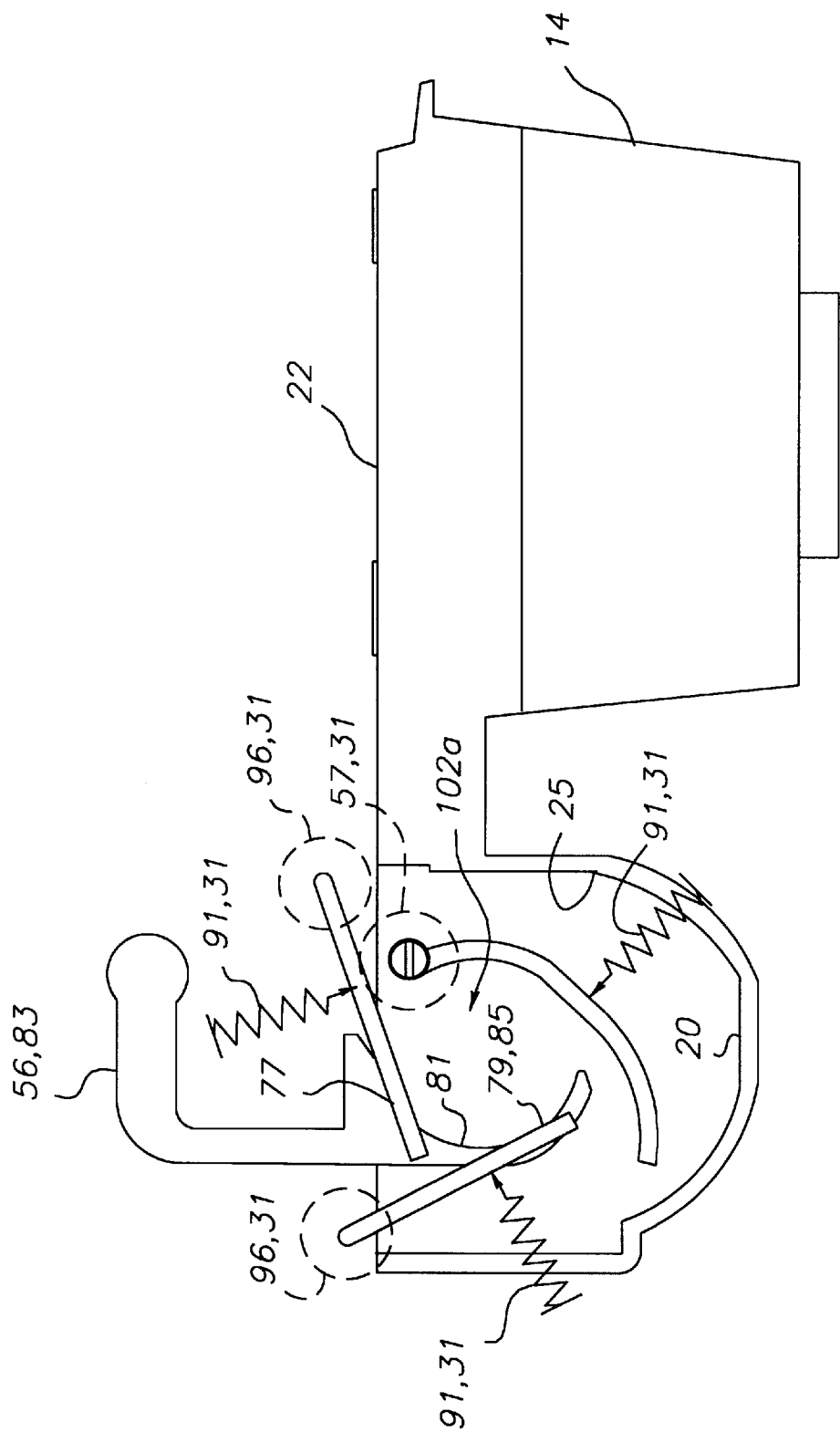
FIG. 3 is partial cross-sectional view of the same parts of the camera frame assembly and apparatus as shown in FIG.
Figure 4:
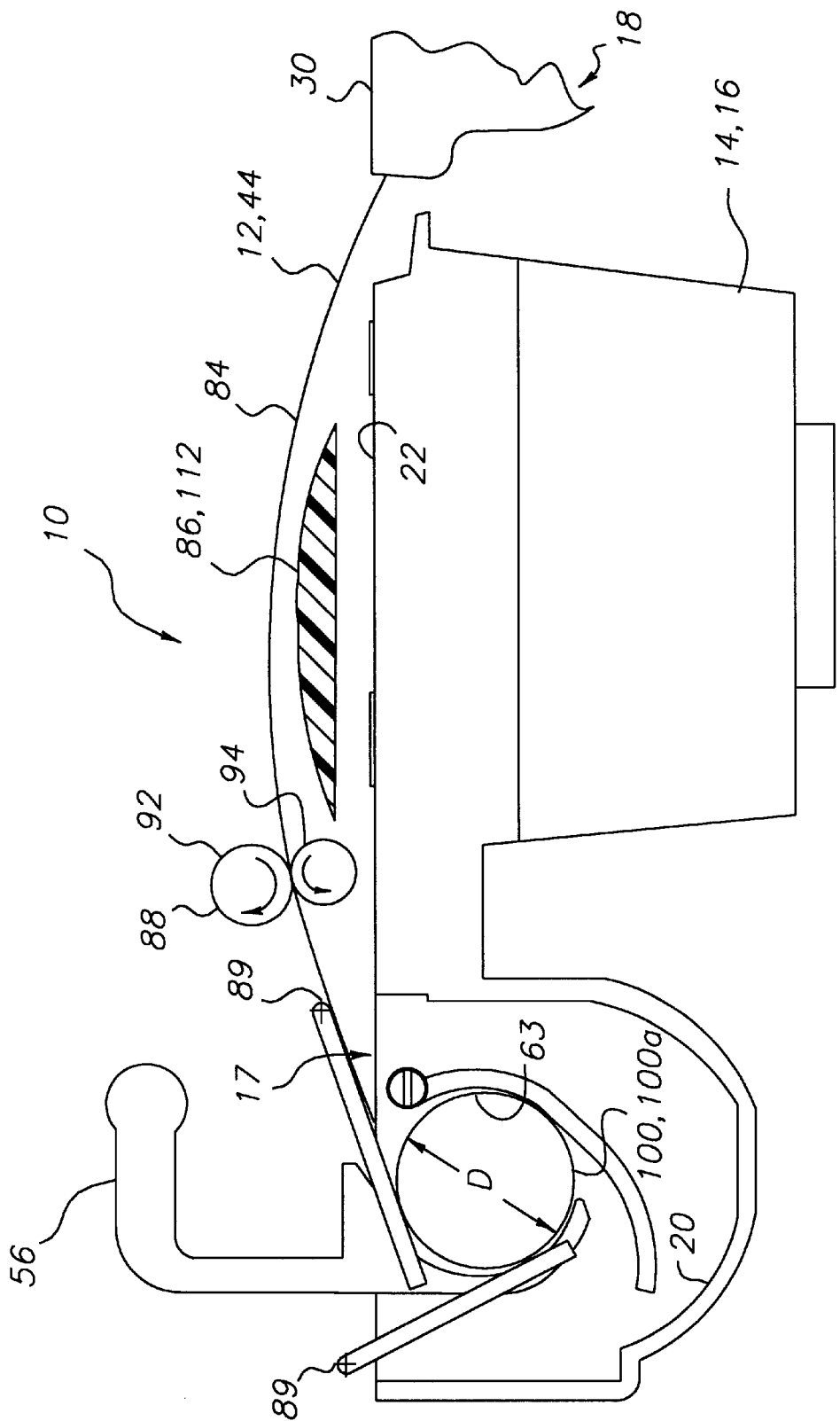

FIG. 4 is the same partial cross-sectional view as FIG. 3, but the positioner is not shown and the film transport, and the filmstrip and part of the cartridge are illustrated. The guide subunits, baffle, and roll starter are shown in start positions against the initial film roll.

Figure 5:
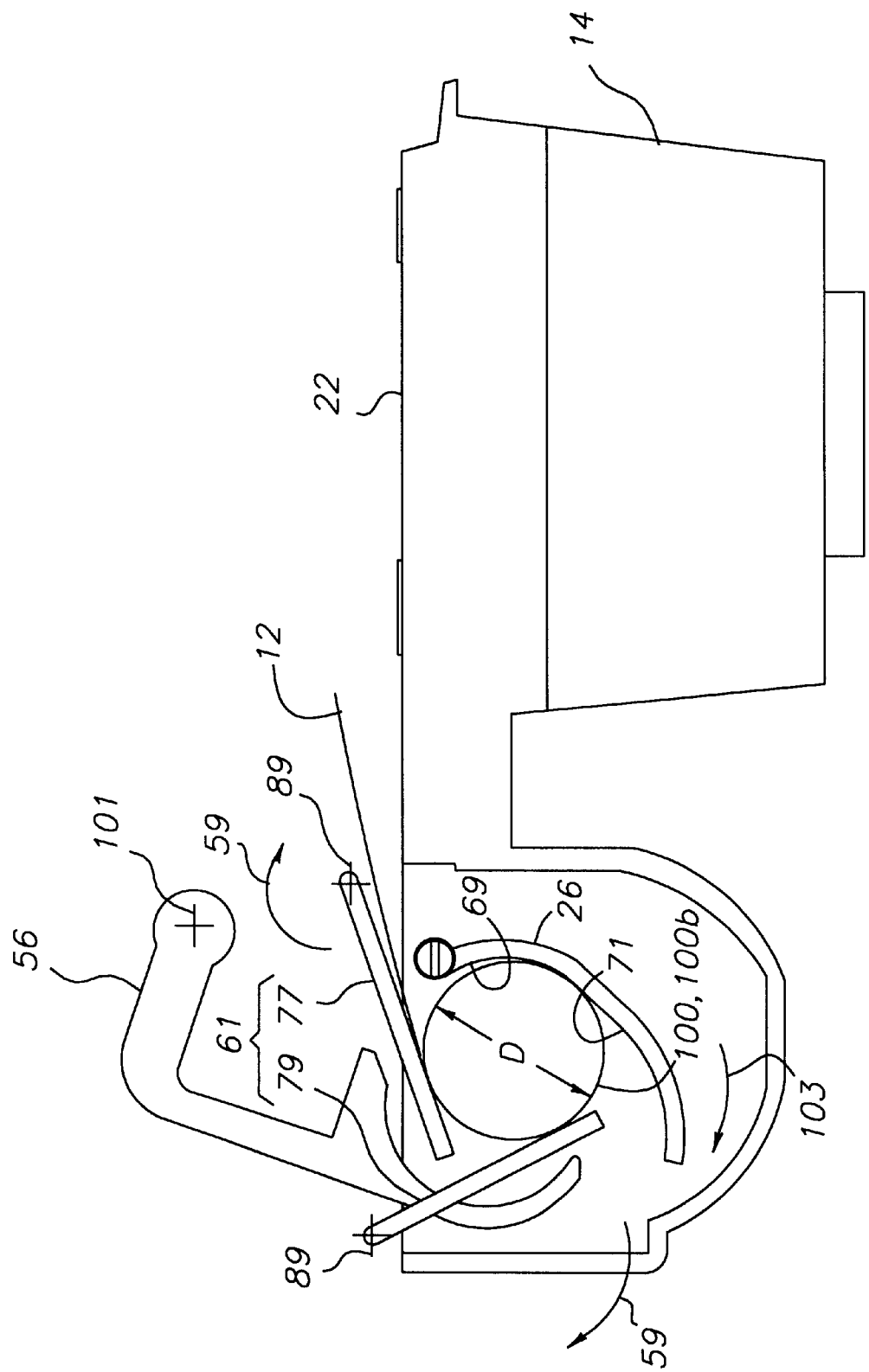

FIG. 5 is the same view as FIG. 4, but the film transport and cartridge are not shown, and only part of the filmstrip is illustrated. The guide subunits and baffle are shown in a first set of intermediate positions against the intermediate film roll. The roll starter is shown tilted away from the film roll.

Figure 6:
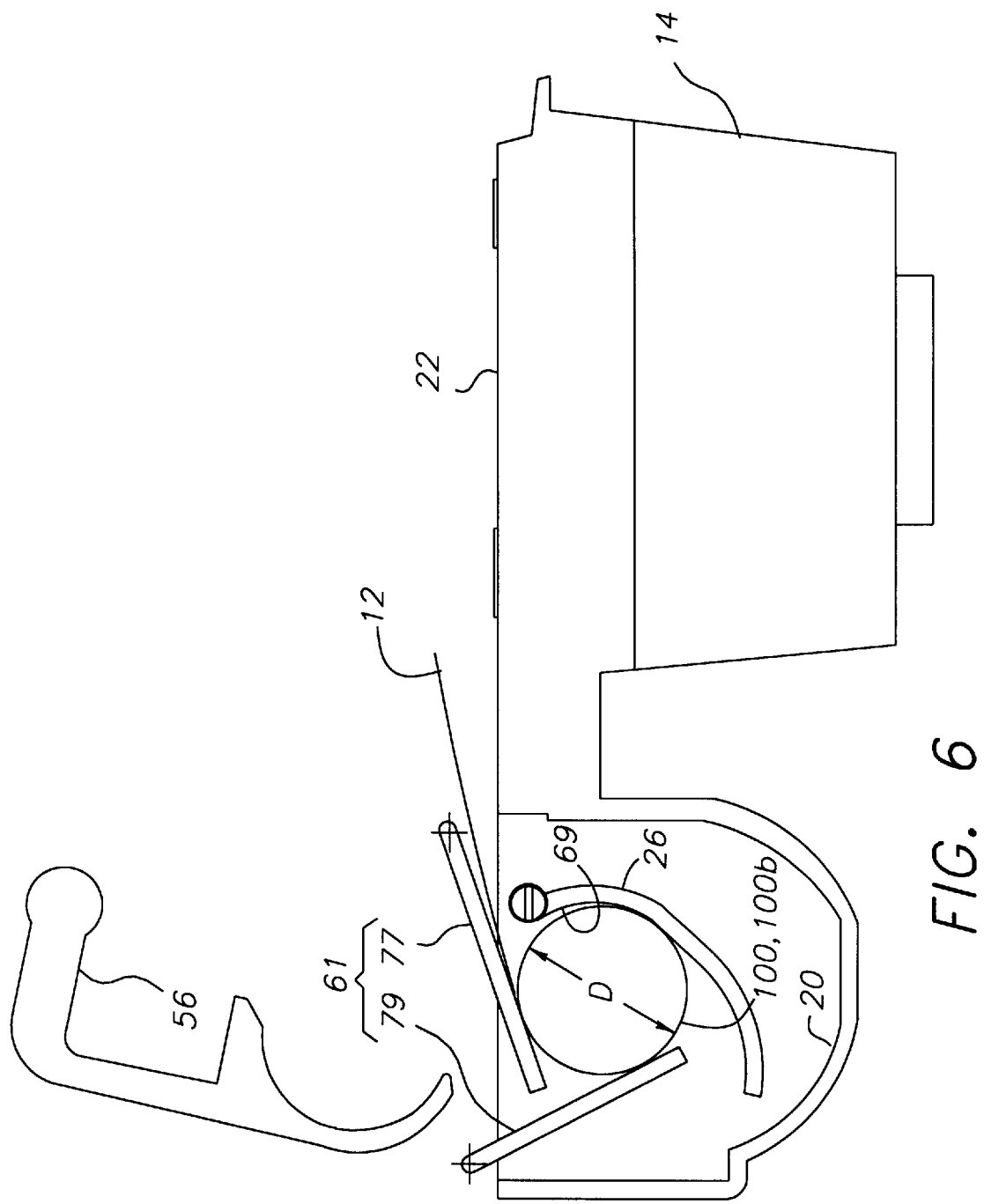

FIG. 6 is the same view as FIG. 5, but the guide subunits and baffle are shown in a second set of intermediate positions against the intermediate film roll. The roll starter is shown being retracted out of the supply chamber.

Figure 7:
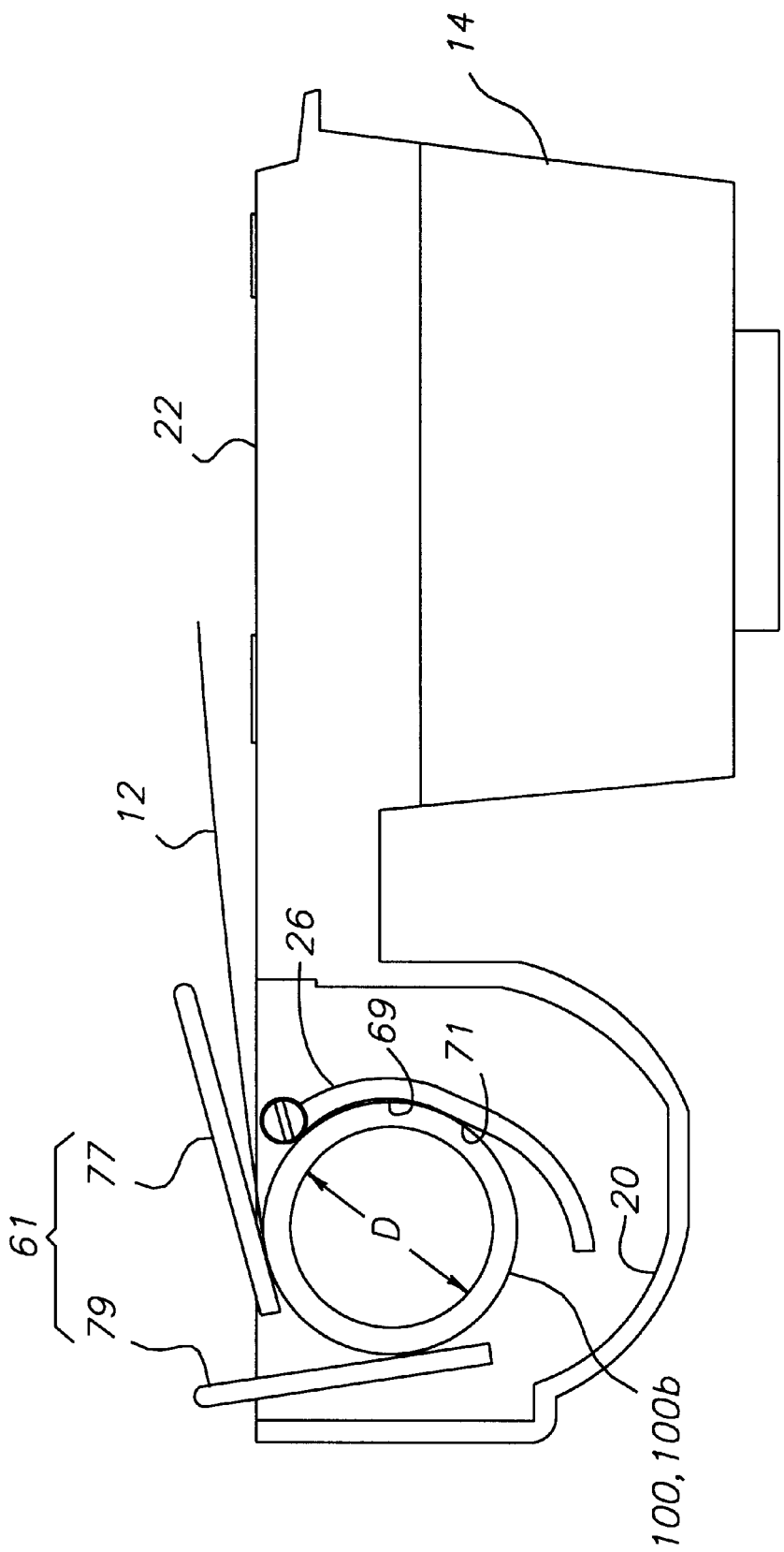

FIG. 7 is the same view as FIG. 6, but the guide subunits and baffle are shown in a third set of intermediate positions.

Figure 8:
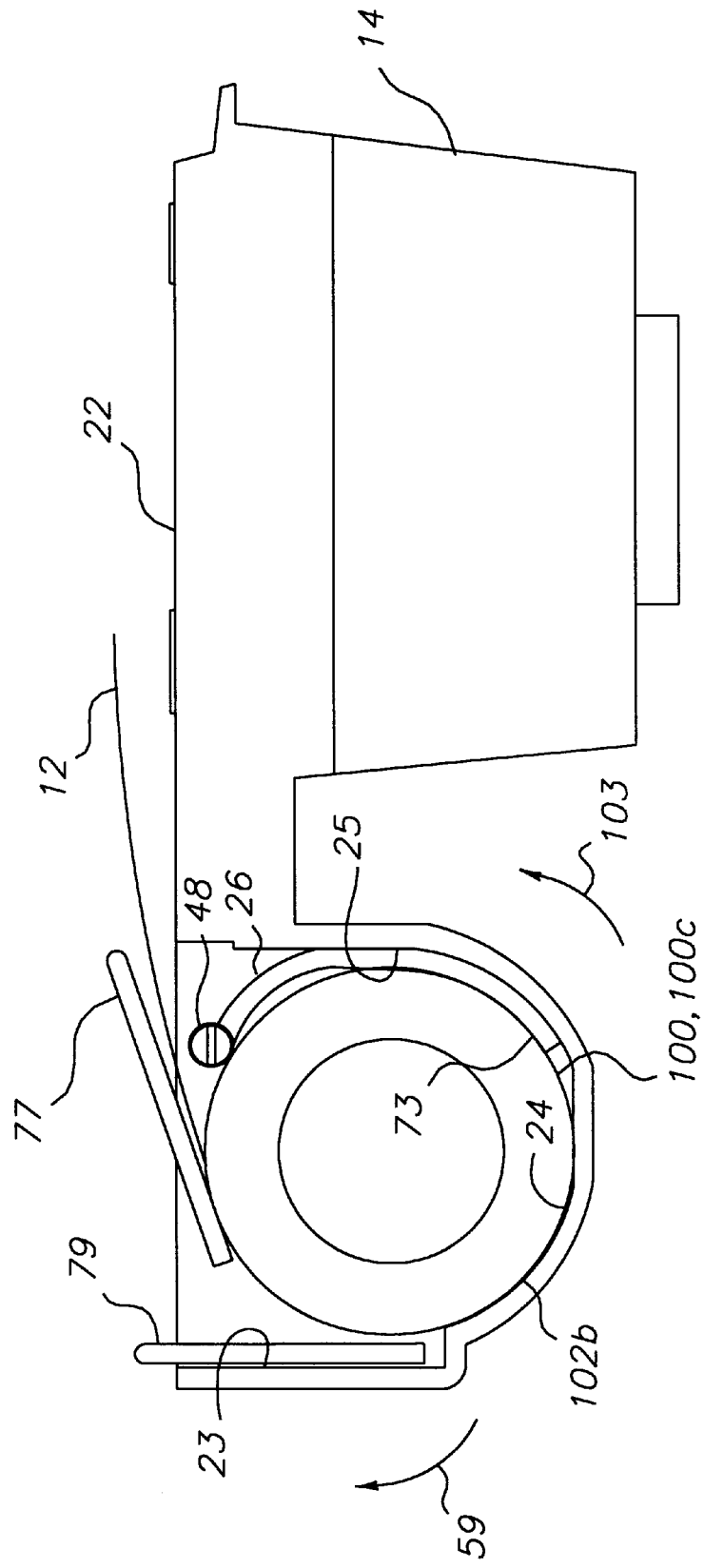

FIG. 8 is the same view as FIG. 7, but the guide subunits and baffle are shown in final positions against the final film roll.

Figure 9:
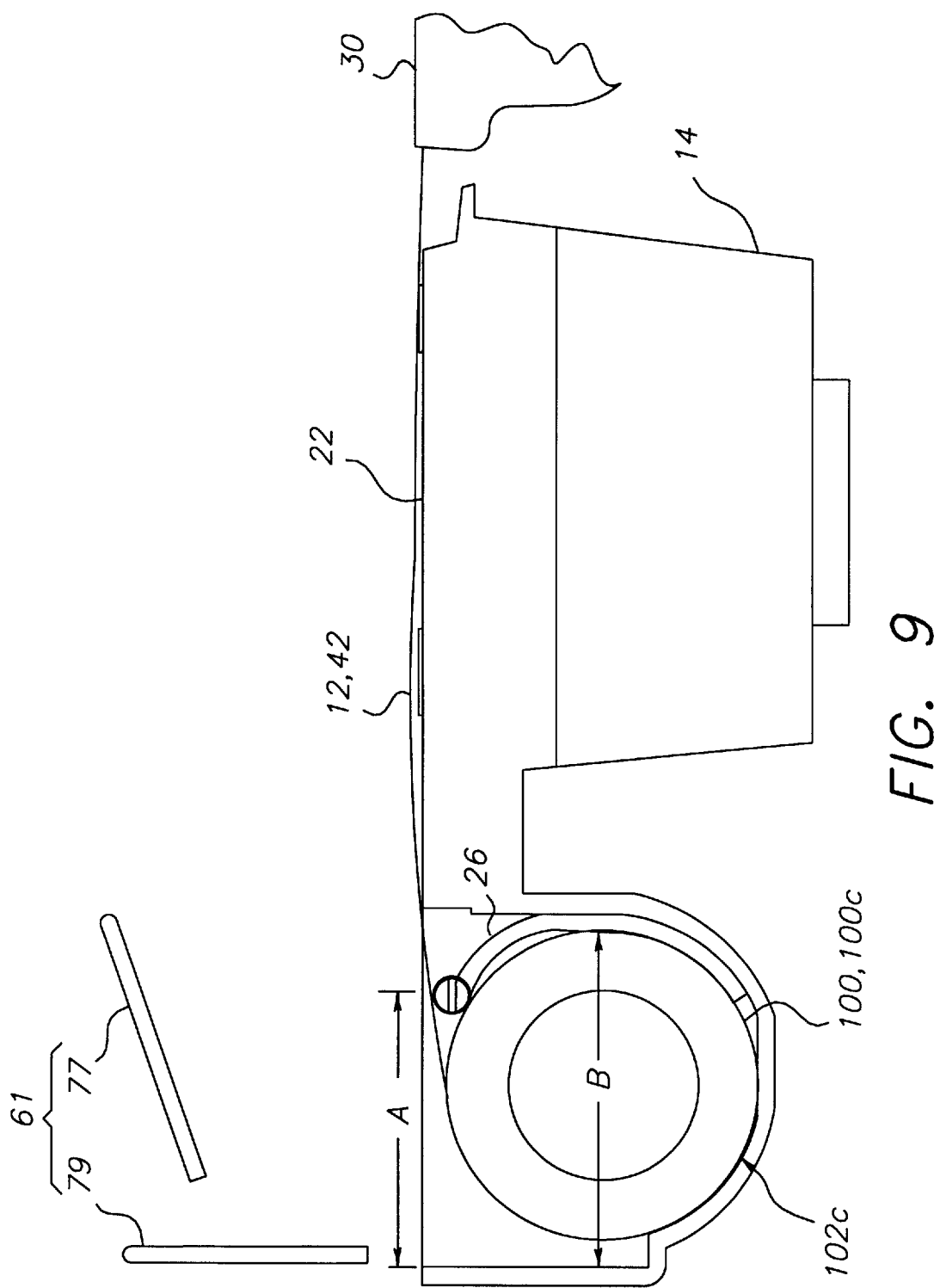

FIG. 9 is the same view as FIG. 8, but the guide subunits and baffle are shown being retracted and part of the film cartridge is also shown.

Figure 10:
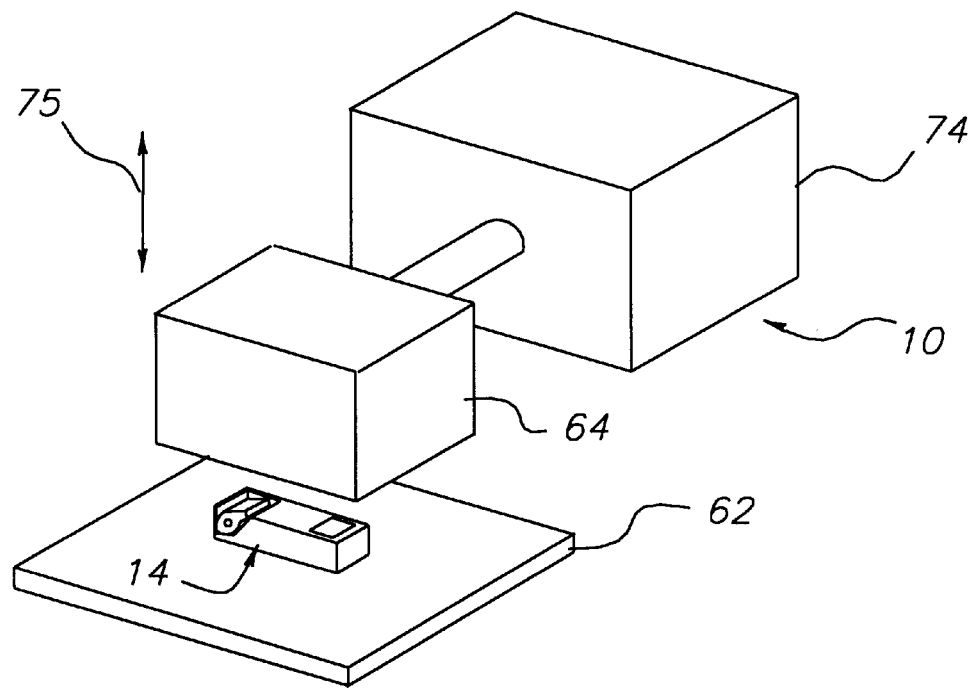

FIG. 10 is a semi-diagrammatical perspective view of an embodiment of the apparatus of the invention.

Figure 11:
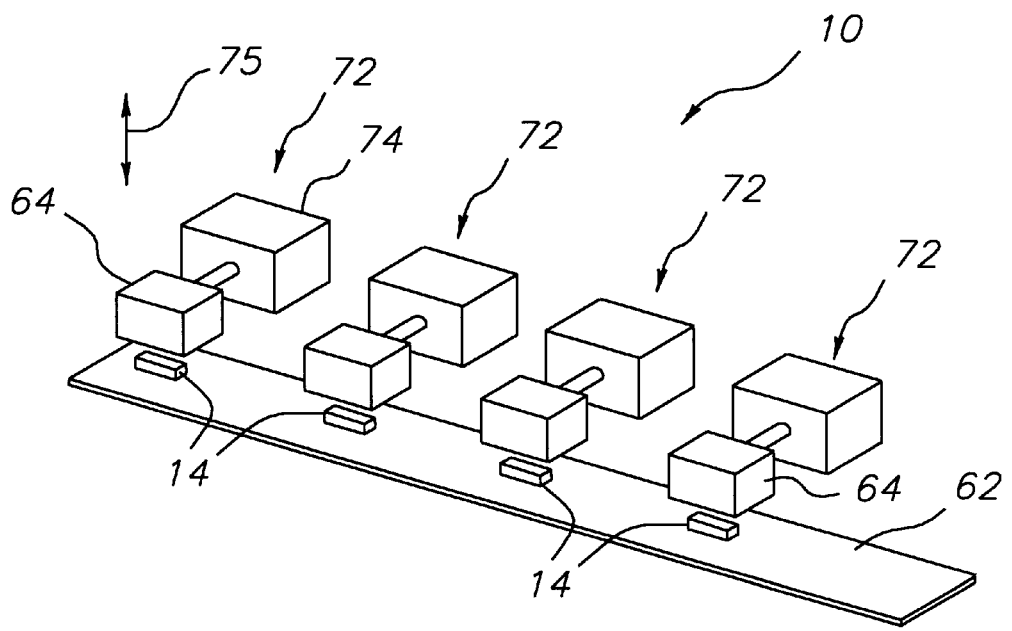

FIG. 11 is a semi-diagrammatical perspective view of another embodiment of the apparatus of the invention.

Figure 12:
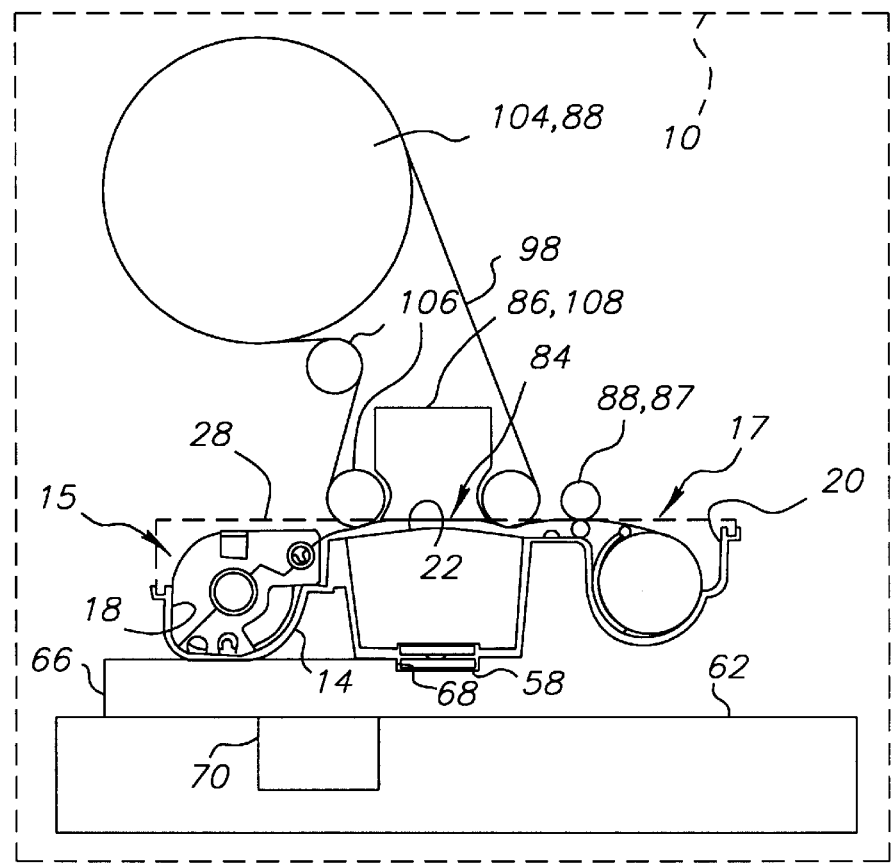

FIG. 12 is a semi-diagrammatical view of an embodiment of the apparatus of the invention, showing a receiver and film bridge. A pallet rests on the receiver. The pallet bears an embodiment of the camera frame assembly (shown in cross-section).

FIG. 13 is a semi-diagrammatical perspective view of still another embodiment of the apparatus and camera frame assembly of the invention. For clarity, the receiver is not shown and the camera frame assembly is shown in cut-away and simplified form. The film bridge and cartridge mover are shown in a use position in solid lines and in a non-use or rest position in dashed lines.

Figure 14:
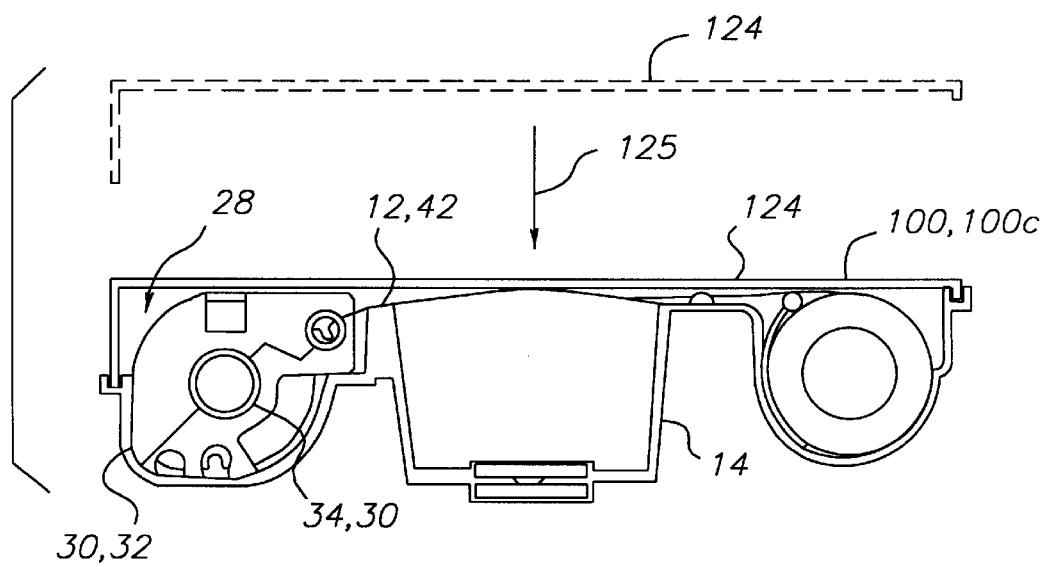

FIG. 14 is the same view of the camera frame assembly as shown in FIG. 12, but showing installation of the back cover. The back cover is shown in dashed lines prior to installation and in solid lines after installation.

Figure 15:
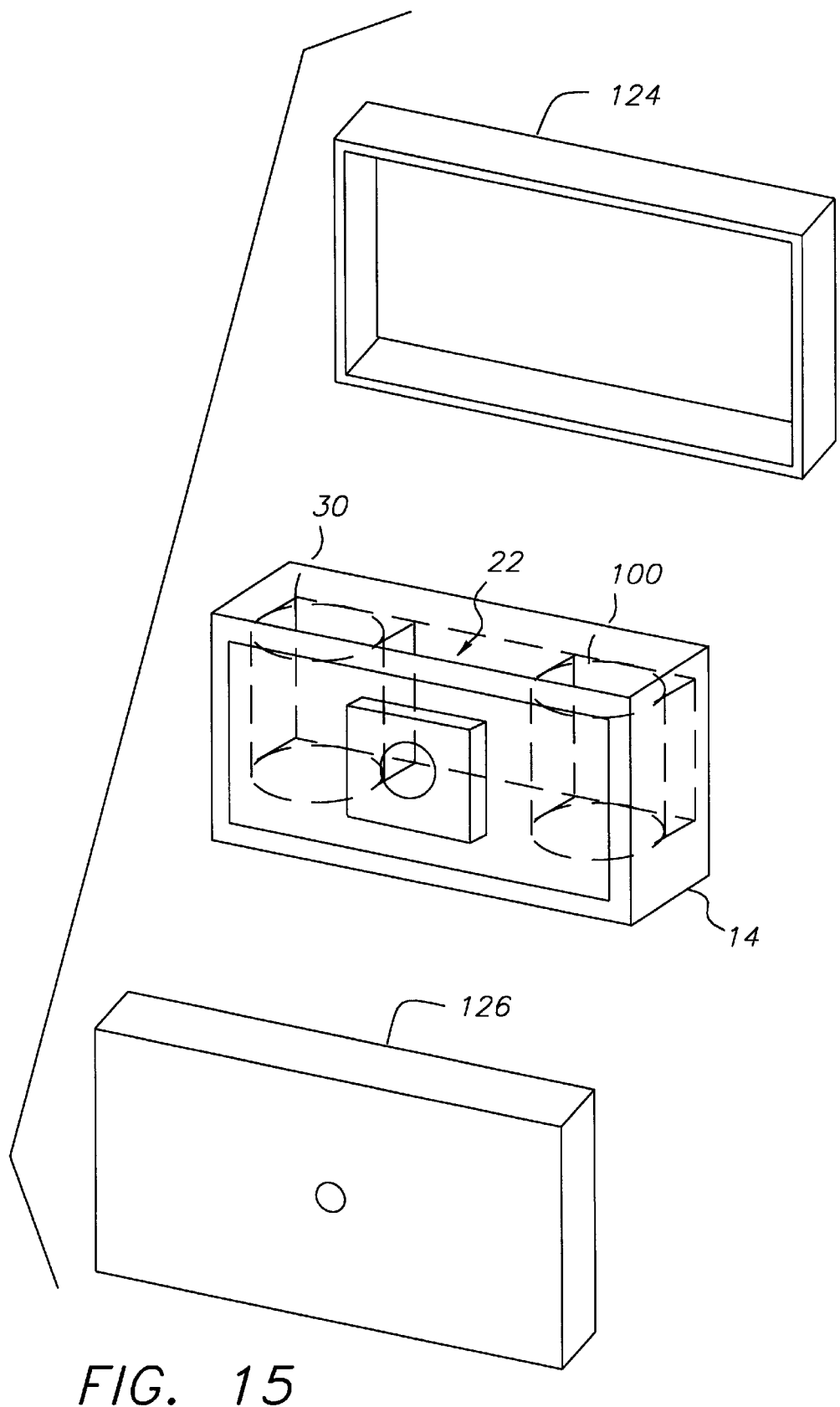

FIG. 15 is an exploded, semi-diagrammatical perspective view of another embodiment of the camera frame assembly of the invention.

DETAILED DESCRIPTION OF THE INVENTION

In the methods of the invention, a filmstrip is propelled from a film source into a supply chamber of a camera or other film housing. The main portion of the filmstrip is wound into a film roll between a guide and a camera baffle. During film winding, the guide and baffle apply substantially radial compressive force against the surface of the film roll as the roll forms. After film winding, the compressive force is relieved and the guide is withdrawn. The baffle is retained in the supply chamber after film winding, and is biased by the film roll against a wall of the chamber. The film housing can be a camera or a film container or a cassette or other article for storing photographic film. The film source can be a bulk roll or a shorter film roll or a film cartridge. The invention is particularly useful in relation to cameras and is generally discussed below in terms of prewinding a filmstrip from a cartridge into the supply chamber of a camera. It will be understood, however, that the invention is not limited to the embodiments discussed and that considerations similar to those discussed herein are applicable to other embodiments. The term "camera frame assembly" is used here to refer to a complete camera or an incomplete subunit of a camera that will later be assembled with other parts to form a complete camera. The invention is particularly advantageous in relation to a camera frame assembly that is a completed or incomplete one-time use camera.

The film loading apparatus 10 prewinds a filmstrip 12, in a darkroom, into a film roll 100 in a camera frame assembly 14. The camera frame assembly 14 includes a camera frame 16 having a take-up chamber 18 and a supply chamber 20. The camera frame 16 has an intermediate section or exposure frame 22 between the chambers 18,20. The take-up chamber 18 has a rearwardly facing opening 15. The back of the supply chamber 20 is has a rearwardly facing throat 17. The throat 17 has a width in a direction parallel to a diameter of the film roll 100 that is larger than the diameter of the film roll.

The supply chamber 20 has end walls 21 that preferably cover the entire end of the supply chamber 20, but can be partially cut away. Baffle 26 is pivotably mounted to the end walls 21 of the supply chamber 20 at the throat 17. The baffle 26 partially occludes the throat 17 resulting in a film passage that has a dimension, indicated by arrow "A" in FIG. 9, that is smaller than the diameter of the film space, indicated by arrow "B" in FIG. 9.

At all times during film loading and camera use, the baffle 26 is fully disposed within the supply chamber 20. The supply chamber 20 has a sidewall 24. The walls 21,24 of supply chamber 20 together define a supply space 19 and a central supply space axis 99. The supply chamber 20 lacks a film spool or other axial film support, thus the supply space or film space 19 is empty except for the baffle 26 and, after loading, the film roll 100. The shape of the sidewall 24 is not critical, as long as the fill roll 100 can be accommodated without gross deformation and any film contact with the sidewall 24 does not cause excessive scuffing. The sidewall 24 has a baffle pocket 25 that receives the baffle 26. The sidewall 24 preferably also has a guide subunit pocket 23. The guide subunit pocket 23 is opposite the baffle 26 and is recessed so as to be set back from the film roll 100. The baffle pocket 25 can also be recessed, if desired. In the embodiment shown in the figures, part of the sidewall 24 is straight and is offset from the film roll 100. The adjoining part has the shape of a quarter of a circular cylinder. The next and remaining portion is the baffle pocket 25, which is shaped to receive the baffle. To save space, the baffle pocket 25 can be complementary in shape to the baffle 26.

A film cartridge 30 is loaded into the take-up chamber of the frame assembly 14. The cartridge 30 includes a canister 32, a spool 34, and the filmstrip 12. The filmstrip 12 has a leading portion 38 having a free end 40, a tail portion or trailing portion 42, which is attached to the spool 34 in the canister 32, and a main portion 44 between the leading and tail portions 38,42. Prior to film loading, the main and trailing portions 44,42 of the filmstrip 12 are wound around the spool 34 in the canister 32. For thrust cartridges 30, such as Advanced Photo Systems™ (APS™) cartridges, the leading portion 38 is also wound around the spool 34.

The frame assembly 14 defines a rear opening or rear accessway (indicated by dashed line 28 in FIG. 12) over the supply chamber 20 and, preferably over both chambers 18,20 and the intermediate section 22. In a particular embodiment of the invention, the supply chamber 20, including the opposed end walls 21, and sidewall 24 is a unitary plastic casting.

The baffle 26 is rigid plastic or other rigid material and has opposed depending and mounted ends 46,48. The mounted end 48 is pivotably joined to the endwalls 21 adjacent the rear opening 28. The nature of the connection between the baffle 26 and the endwalls 21 is not critical, as long as the baffle 26 is pivotable about an axis 47 parallel to the supply space axis 99. The baffle, absent the apparatus of the invention, can be freely pivotable or slightly biased to rotation toward the throat 17. For example, ears 50 of the baffle 26 can simply be loosely received by sockets 52 in respective endwalls 21. The endwalls 21 can be slightly flexible to allow the baffle 26 to be snapped into place during manufacture. In the embodiment shown in the figures, one of the sockets 52 is open, allowing access by a rotation tool 57 of a positioner 31, to a receptacle 49 in the respective ear 50. The receptacle can have any of a variety of forms. The simplest is a screwdriver slot or grip shaped to receive a matching rotation tool 57. The other socket 52 can be open or can be blind. If desired, both sockets 52 can be made light-tight by overlapping adjoining edges to provide light-blocks or by other means well known to those of skill in the art.

The baffle 26 curves between the ends 46,48 and has inner and outer surfaces 53,54, respectively. The inner surface 53, which contacts the film roll 100, has a concave curve and can be configured to prevent contact with the image area of the filmstrip and to reduce friction. The inner surface 53 can have protruding complete or partial film rails 55, or can be relieved or cut-away (not shown) in areas that would otherwise contact the image area of the filmstrip.

Similar features, protrusions, or relief structures can be provided on the mounted end 48 of the baffle 26 for the same purpose. Roller bearings or a low friction layer can likewise be provided at one or more places on the inner surface 53 of the baffle 26.

The outer surface 54 of the baffle 26 is shaped so as to be received by the baffle pocket 25. In the embodiment shown in the drawings, the outer surface 54 is convexly curved about the supply space axis 99, complementary to the baffle pocket 25.

The camera frame assembly 14 can also include other camera components which have been previously installed on the camera frame 16. For example, the camera frame assembly 14 can include an exposure system 58, including one or more sub-components such as a baffle, a lens system, and a shutter. The frame assembly 14 can include a camera film drive having a film engagement member (indicated diagrammatically in FIG. 12 by a semicircle 60) which adjoins the intermediate section 22 and engages film perforations (not shown) for film metering or both film metering and film transport. A variety of such camera film drives are well known to those of skill in the art. In such drives, the film engagement member can be a linearly reciprocated pawl; however, a continuously or intermittently toothed sprocket is more commonly used as the film engagement member. With some film transport mechanisms, such as conventional sprocket types, it is necessary to lift film above the sprocket or other film engagement member during prewinding. With other film transport mechanisms, such as some intermittently toothed sprocket types, the film can move past the sprocket or other film engagement member without causing it to rotate or otherwise actuate. The apparatus and method of the invention, in different embodiments, can accommodate either type of film transport mechanism.

The apparatus 10 of the invention includes a receiver 62, and active components 64 for cartridge loading, film transporting, and film rolling. The receiver 62 supports the camera frame assembly 14 or other housing in a predetermined loading position 14a or series of positions 14a relative to the active components 64. The receiver 62 has a predetermined relationship to other components 64 and thus, during assembly, defines a predetermined relative location or site for each of the chambers 18,20, opening 15 and throat 17, intermediate section 22, and rear opening 28. (Sites correspond to features of the frame assembly 14 and are necessarily predetermined for a particular frame assembly 14 by adjusting physical constraints such as relative positions of the receiver 62 and other components 64 of the apparatus 10.) The receiver 62 can accept the camera frame assembly 14 directly or can be adapted to accept a pallet or nest 66 or the like. In that case, the camera frame assembly 14 is held in a predetermined relation to the pallet 66, which in turn, is held in a predetermined loading orientation by the receiver 62. Indexing features 68 can be provided on the pallet 66 to permit the camera frame assembly 14 and the receiver 62 to be readily aligned. The frame assembly 14 can be provided to the receiver 62 premounted on a pallet 66 or the pallet 66 and frame assembly 14 can combined on the receiver 62.

The receiver 62 can have a variety of features for supporting automated assembly operations. For example, the receiver 62 can include a movement system or repositioner 74, for moving a camera frame assembly 14 between the apparatus 10 of the invention and one or more other assembly stations or between stations 72 having different components 64 of the apparatus 10 of the invention. For example, in FIG. 12, the repositioner 74 (illustrated schematically) can be a conveyor or track for moving the camera frame assembly 14 in directions perpendicular to the plane of the figure. The apparatus 10 components 64 can each include an actuation mechanism 74 such as a retraction-extension unit to allow the component 64 to extend to an active position for use and to retract to a store position clear of the movement system 70 between actuations. (Directions of movement for one component 64 are indicated in FIGS. 10–11, by double-headed arrow 75.) The actuation mechanism 74 can also include other parts for imparting motion to component 64, such as rotary or linear drives. As a matter of convenience, the discussion herein generally treats the receiver 62 as being static relative to other components 64 of the apparatus 10 of the invention.

Referring now primarily to FIG. 13, the apparatus can include a cartridge mover 76 for positioning the cartridge 30 in the take-up chamber site. The cartridge mover 76 can be simply a pick and place mechanism or can provide additional functions. In the embodiment of the invention shown in FIG. 13, the cartridge mover 76 has a vacuum gripper 78 which allows the cartridge mover 76 to position the cartridge 30 in the site of the take-up chamber 18. The vacuum gripper 78 or a holddown (not shown) can be used to retain the cartridge 30 in the take-up chamber 18 during film winding, if the camera frame assembly 14 lacks features to prevent oscillation or other movement. In this embodiment, the cartridge mover 76 also supports an active light lock opener 80 and a spool rotator 82. The active light lock opener 80 pivots to open the active light lock of a suitable film cartridge 30, such as an Advanced Photo Systems™ (APS™) cartridge, prior to placement of the cartridge 30 in the take-up chamber site. This allows the camera frame assembly 14 to include a detent (not shown) which retains the active light lock in the open position prior to cartridge removal for processing. The spool rotator 82 engages the spool 34 of the APS cartridge 30 and rotates the spool 34 to thrust film from the cartridge 30.

The camera frame assembly defines a film path 84 extending from the site of the take-up chamber 18 to the site of the supply chamber 20. (In FIGS. 4 and 12, the film path 84 is occupied by the filmstrip 12; and a film bridge 86 is disposed over the intermediate section 22 and defines parts of the film path 84.)

The apparatus 10 has a film transport 88, disposed in operative relation to the film path 84, to propel the filmstrip 12 along the film path 84 to the throat 17 of the supply chamber 20. The film transport 88 can use a driven roller, or belt, or other conventional film transport device to move the film along the film. path 84. With a thrust-type film cartridge 30, a spool rotator, like that previously discussed, can also be utilized.

The use of a film bridge 86 is preferred in embodiments of the invention in which the camera film drive has a film engagement member 60, such as a conventional sprocket, that continually extends into the intermediate section 22. The film bridge 86 causes the film path 84 to be spaced apart from the intermediate section site and separates the filmstrip 12 from the engagement member 60 of the camera film drive, which thus does not need to be disabled or the like during roll formation. In some other embodiments, the film engagement member 60, is a skater (an intermittent toothed sprocket) or the like and can be positioned so as to not extend into the intermediate section 22 during film winding. In these embodiments the use of a film bridge 86 is not mandatory, since film winding through the intermediate section 22 will pass freely over the film engagement member 50. A frame assembly 14 having film retention fingers can be used. Such a frame assembly is disclosed in U.S. patent application Ser. No. 08/96,155, entitled "One-Time-Use Camera Having Main Body Part And Insertable Light Baffle With Film Holders To Facilitate Camera Assembly", filed Feb. 6, 1997, by Douglas H. Pearson, which is hereby incorporated herein by reference. The film retention fingers define and guide the filmstrip 12 along part of the film path 84 into the throat 17.

The film bridge 86 can take a variety of forms. The film bridge 86 can include the film transport 88, or the bridge 86 can be separate from the film transport 88, or the film transport 88 can have multiple drive elements with one or more incorporated in the film bridge 86 and one or more separate from the film bridge 86. The figures illustrate some different film transports 88 and film bridges 86.

In FIG. 12, a film bridge 86 in the form of an endless-belt mechanism is positioned over the intermediate section 22 of the camera frame assembly 14. The endless belt 98 can be disposed between the filmstrip 12 and the intermediate section 22 of the camera frame assembly 14 or, as shown in FIG. 12 can overlie the filmstrip 12. The mechanism 42 includes a belt drive 104 and idlers 106 which position and tension the belt 98. An endless belt 98 overlying the filmstrip 12 can have holes (not shown) and include a vacuum-compressed gas unit 108 which provides a vacuum to pull the filmstrip 12 against the belt 98 for transport, and directs compressed gas against the filmstrip 12, or uses gravity to release the filmstrip 12 from the belt 98. The film drive includes the belt drive of the endless-belt mechanism and a separate capstan 87 adjoining the supply chamber 20. The capstan 87 defines a nip between first and second capstan rollers 92,94 disposed above the level of the film plane in the resulting camera. One or both capstan rollers 92,94 can be centrally relieved or divided into two sub-rollers (not shown) in order to contact only the edges of the filmstrip.

A similar embodiment is shown in FIG. 4, but in this case the endless belt mechanism is replaced by a turtleback 112. It is preferred that the turtleback 112 present minimal friction to the filmstrip 12. The turtleback 112 can provide one or more friction reducing features (not shown); such as holes and a pressurized gas connection to create an air cushion, or rotary bearings. Another example of a suitable film bridge 86 is a vacuum shuttle, such as that disclosed in U.S. Pat. No. 5,125,630.

The film bridge 86 can be permanently positioned relative to the receiver 62 or a repositioner 74 can be provided for moving the film bridge 86 relative to the receiver 62, between a use position over the intermediate section site and a rest position spaced apart from the use position. Other components 64, such as a cartridge mover 76, can be repositioned in the same manner between active and rest positions (for example see 76a,64a and 76b,64b, respectively, in FIG. 13).

The film transport 88 can include one or more deflectors (not shown) positioned to direct the filmstrip 12 into the supply chamber 20. The deflectors are preferably centrally relieved or otherwise configured to eliminate or minimize contact with the image area of the filmstrip.

Referring now to the embodiment of the method of the invention shown in the figures, a film cartridge 30 is first gripped and placed in the take-up chamber 18 of the camera frame assembly 14. The cartridge mover 76 can simply place a film cartridge 30 in the take-up chamber 18 or can pick up a cartridge 30 from a supply (not shown), move the cartridge 30 to the take-up chamber 18, and then continue to grip or otherwise retain the cartridge 30 in position until film winding is completed. This is convenient if the camera frame assembly 14 lacks features to prevent oscillation or other movement of the film cartridge 30 during film winding. An active light lock opener 80 can be pivoted to open the active light lock of a suitable film cartridge 30, such as an Advanced Photo System™ (APS™) cartridge, prior to placement of the cartridge 30 in the take-up chamber site. This allows the camera frame assembly 14 to include a detent (not shown) which retains the active light lock in the open position during film use.

Figure 1:
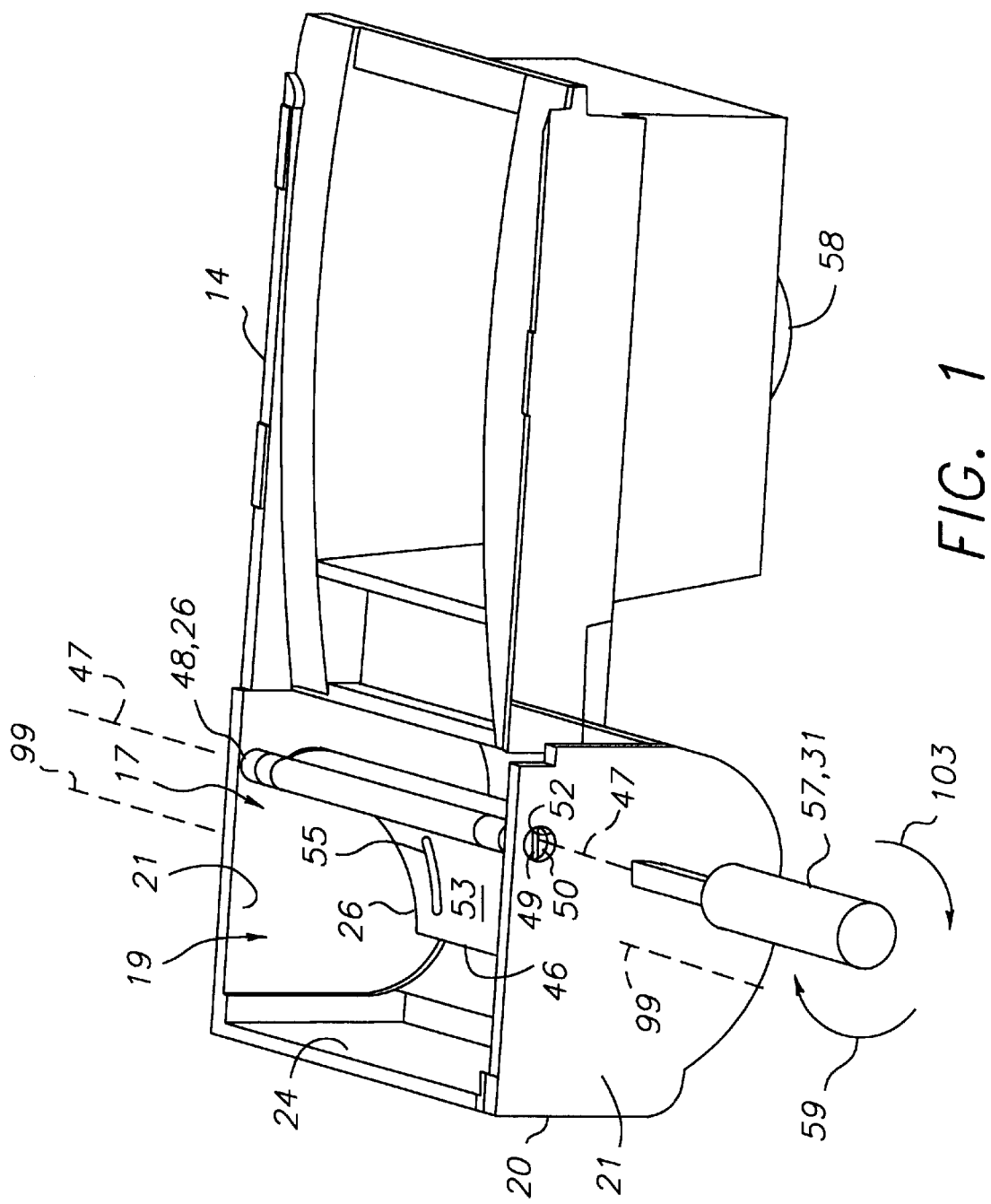
FIG. 1 is a partial, perspective view of the camera frame assembly of the camera of the invention and the rotation tool of the apparatus of the invention.
Figure 2:
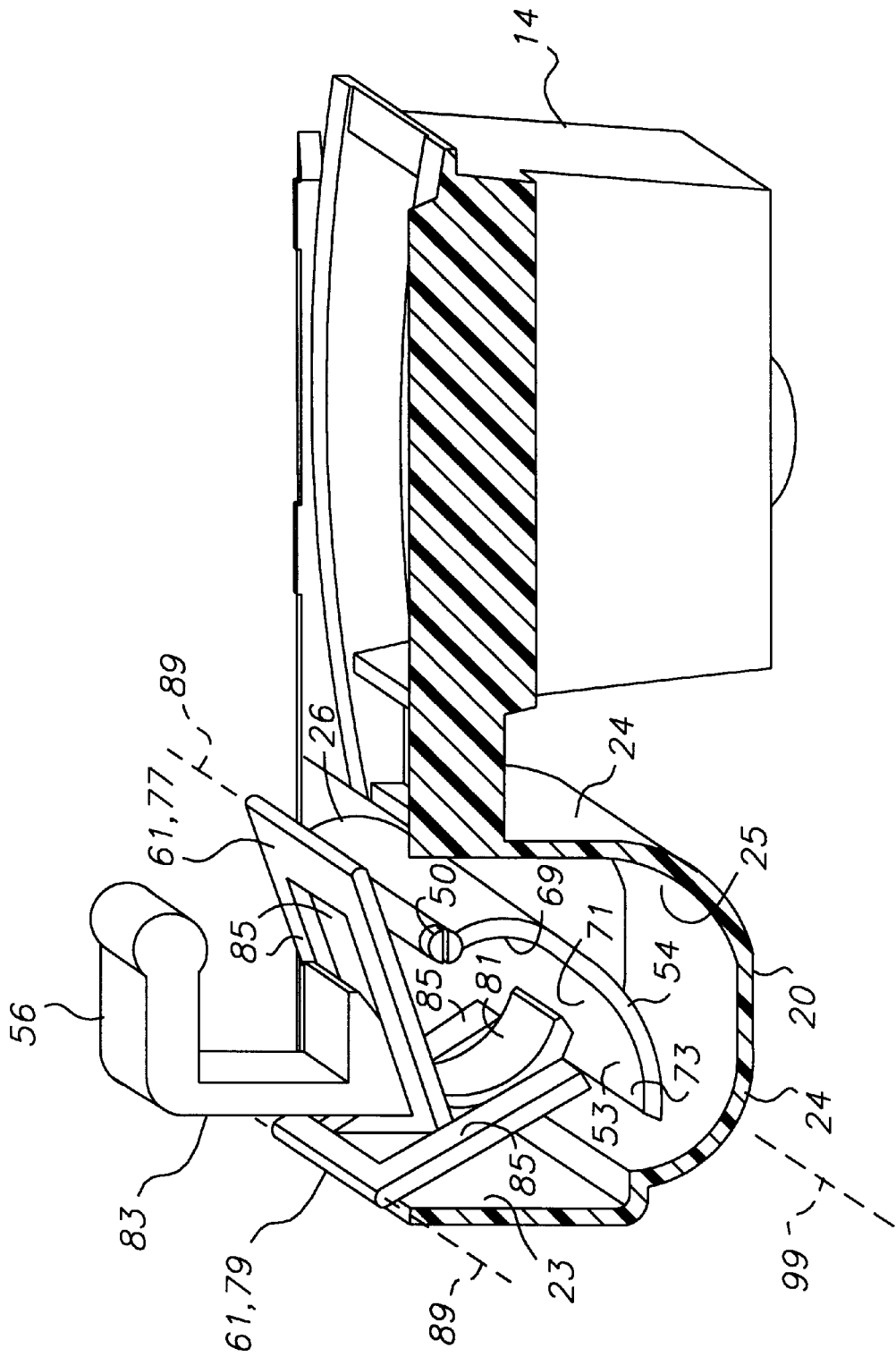
FIG. 2 is a partially cut-away perspective view of the camera and apparatus of FIG. 1 showing the camera frame assembly and the guide and roll starter of the apparatus.

The filmstrip 12 is advanced by the film transport 88 from the cartridge 30 along the film path 84, and the free end 40 of the filmstrip 12 enters the supply chamber 20. At this time, or earlier; a rotation tool 57 is inserted into the receptacle 49 of the baffle 26, and the baffle 26 is rotated, in the direction of arrow 59, to a start position shown in FIGS. 1 and 2. A guide 61 is also extended into the supply chamber 20 prior to or at the time the filmstrip 12 is initially transported to the supply chamber 20.

The manner in which the film transport propels the filmstrip varies with the film type and the characteristics of the camera frame assembly. With a thrust type film cartridge, such as an APS cartridge, the spool rotator 82 engages the spool 34 of the cartridge 30 and rotates the spool 34 to thrust the filmstrip 12 from the cartridge 30. The film transport 88 can be limited to the spool rotator or can include another mechanism, such as a capstan, that takes over for or operates with the spool rotator 82. Depending upon the film drive of the camera frame assembly 14, as discussed above, a film bridge 86 can be positioned over the intermediate section 22 of the frame 16. Friction reduction can be provided on the film path 84. For example, air can be blown through holes in the vacuum/air belt 98 of a film bridge 86 to provide an air cushion.

The guide 61 and baffle 26 compel the transported filmstrip 12 to coil into a film roll 100. The formation of the film roll 100 is subject to countervailing design constraints. Considerable force on the filmstrip is required to bend the leading portion 38 of the filmstrip 12 into an innermost turn 63 of the film roll 100; much less force is required to wind the main portion 44 over the initial film roll 100a . (The initial film roll 100a has a least one turn.) During formation of the initial film roll 100a, force is desirably applied over a relatively large area of the filmstrip to reduce the risk of pressure fogging. During winding of the main portion 44, contact is desirably over a small area of the filmstrip to reduce friction and the risk of the filmstrip momentarily catching (that is, moving in a start and stop manner) and the resulting film scuffing. These constraints can be met, within the scope of the invention, in a variety of ways. The embodiment shown in the figures is particularly suitable, since it provides good compliance with the above design constraints, with simplicity.

Referring now particularly to FIGS. 1–9, the inner surface 53 of the baffle 26 has an initial portion 69, adjoining the mounted end 48, that has the same curvature as the innermost turn 63. Next to the initial portion 69, is an intermediate portion 71 that is substantially straight, as shown in the figures. Adjoining the intermediate portion 71, is an end portion 73 that has the same curvature as the completed film roll 100c, shown in FIGS. 8–9. This shape allows the baffle 26 to have relatively extensive contact with the film roll 100 at the beginning and end of film winding, but greatly reduced contact with the intermediate film roll 100b, shown in FIGS. 5–7. The guide 61 can have this same shape, but this would require a relatively large supply chamber. Instead, in this embodiment, the guide has two separate, flat guide subunits 77,79 and a roll starter 56 is used to coil the initial turn 63.

The first and second guide subunits 77,79 are each planar and are each bifurcated into a pair of spaced apart arms 85. Guide subunits 77,79 are each pivotable about a separate axis 89 (indicated by "+" in FIG. 4). For reasons or convenience and required space in the supply chamber 20, it is preferred that the axes 89 are external to the supply chamber. The first guide subunit 77 generally overlies the baffle 26 during film loading and with the baffle 26 defines a gap through which the film enters the supply chamber 20. The second guide subunit 79 is adjacent to an end of the frame 16. The longer dimensions of the guide subunits 77,79 are roughly orthogonal during film loading.

The roll starter 56 is shaped like a cinch dog and has an arcuate head 81 that contacts the filmstrip 12 and a shank 83 that joins roll starter 56 to an actuation mechanism 74 (illustrated generally in FIGS. 10–11). The head 81 of the roll starter 56 has a width dimension parallel to the film space axis 99 that is less than the separation between the members of each pair of arms 85.

Prior to coiling of the initial film roll 100a, the guide subunits 77,79 and the roll starter 56 are interposed into the supply chamber 20. The baffle 26 and guide subunits 77,79 are, as necessary, rotated to start positions by the rotation tool 57 and rotation members 96 (indicated by dashed lines in FIG. 3) of the positioner 31. In start position the baffle 26 and roll starter or the guide subunits 77,79, the baffle 26, and the roll starter 56, border and define a cylindrical initial roll space 102a. It is preferred that, in start position, both guide subunits 77,79 are tangent to the initial roll space 102a to maximize contact with the leading portion 38 of the filmstrip 12.

After formation of the initial film roll 100a, the roll starter 56 is withdrawn from the supply chamber 20. Referring to FIG. 5, the roll starter 56 is moved away from the film roll 100a by rotation or translation or both and is then extracted from the supply chamber. In FIG. 5, rotation is about an axis 101 (indicated by "+") external to the supply chamber. The withdrawal of the roll starter 56 is independent of the baffle 26 and the guide subunits 77,79; which are retained against the film roll 100.

After formation of the initial film roll 100a, main portion 44 of the filmstrip 12 is wound over the initial film roll 100a. During the winding, the guide subunits 77,79 and baffle 26 are displaced out of the start positions and are pivoted away from the film roll 100 to intermediate positions shown in FIGS. 5–7 and then to the final positions shown in FIG. 8. The baffle 26 is pivoted in the direction indicated by arrow 103 (counter-clockwise in FIGS. 1–9) and the guide subunits 77,79 are rotated in the direction indicated by arrow 59 (clockwise in FIGS. 1–9) This movement of the guide subunits 77,79 and baffle 26 maintains the film roll 100 at a constant internal diameter (indicated by "D" in FIGS. 4–7); and preferably subjects the film roll 100 to a substantially constant (+10 percent) or diminishing frictional resistance during winding to help maintain the constant internal diameter and reduce the risk of film scuffing. During winding, the guide subunits 77,79 and baffle 26 can be held in respective positions nonresiliently or the postioner 31 can include a biasing member 91 (illustrated diagrammatically in FIG. 3) to resiliently bias one or more of the guide subunits 77,79 and baffle 26 in the direction of the film roll 100.

Film transport is continued until the main portion 44 of the filmstrip 12 has been wound onto the forming film roll. The remaining or trailing portion 42 of the filmstrip 12 remains attached to the spool 34 in the film cartridge 30 and after winding extends across the intermediate portion 22 to the final film roll 100. Film transport is stopped before an excessive strain is placed on the trailing portion 42. This may be done in a variety of ways. For example, a sensor (not shown) can detect an increased load on the film transport 88 due to reaching the trailing portion 42; or count rotation of the film spool 34 or another rotating part; or track the length or area of filmstrip 12 traveling to the film roll; or film can be wound for a predetermined time. With any of these approaches a slip clutch (not shown) can be provided in the film transport 88 to accommodate excessive strain.

Referring to FIGS. 8–9, when film transport has been completed, the guide subunits 77,79 and baffle 26 are pivoted slightly further, in directions 59 and 103, respectively to release the guide subunits 77,79 from the film roll 100 and to seat the baffle 26 in the baffle pocket 25. At the same time, the film roll 100 remains constant in size or clocksprings only slightly until the film roll 100 occupies a final film roll space 102c. It is desired that the extent of clockspringing A following film winding, be minimized to, for example, about the thickness of the film; since this prevents excessive contact of the filmstrip with the chamber 20 while the film roll 100 is minimizes scuffing due to clockspringing. In the embodiment of the invention shown in the figures, further expansion of the final film roll 100c is blocked by contact of the film roll 100 with the mounted end 48 and end portion 73 of the baffle 26, and with the sidewall 24 of the supply chamber 20. In this embodiment, the removal of the guide subunits 77,79 is also unlikely to scuff the film. Guide subunit 77 is above the film roll and can simply be lifted free of the film. Guide subunit 79 is seated in the guide subunit pocket 23 and is spaced apart from and unconstrained by the final film roll 100c and can be removed vertically without film contact.

After film winding, the apparatus components such as the capstan rollers 92,94 and guide 61, can be moved to a non-use position, relative to the camera frame assembly 14, which is then moved along for further processing. In embodiments of the invention having a film bridge 86, the camera frame assembly 14 is first displaced relative to the film bridge 86, and slack in the filmstrip 12 is taken up by retracting that filmstrip 12 portion back into the cartridge 30 or driving that filmstrip 12 portion forward with a driven roller (not shown) or the like.

After the film transport 88 is moved away from the camera frame assembly 14, the rear opening 28 of the camera frame assembly 14 is light-tightly closed. Referring now to FIG. 14, in a particular embodiment of the invention, this is accomplished by placing (indicated by arrow 125) a light-tight rear cover 124 over the chambers 18,20 and intermediate section 22 and a front cover 126 over the camera frame assembly 14. The resulting camera assembly can be a completed camera or can be completed in other assembly operations. In addition to the features already discussed, including a film cartridge 30 and film roll 100, the camera can also include other conventional camera features well known to those of skill in the art.

The invention has been described in detail with particular reference to certain preferred embodiments thereof, but it will be understood that variations and modifications can be effected within the spirit and scope of the invention.

What is claimed is:

1. A method for loading photographic filmstrip into a supply chamber having an internal baffle, said method comprising the steps of:

interposing a guide in said chamber;

transporting a leading portion of said filmstrip into said chamber;

coiling said filmstrip within said chamber, between said guide and said baffle to form a film roll;

during said coiling, maintaining an internal diameter of said film roll constant;

withdrawing said guide from said chamber; and following said withdrawing step, retaining said baffle within said chamber.

2. The method of claim 1 wherein said baffle is biased by said film roll against a wall of said chamber during said retaining.

3. The method of claim 1 wherein said baffle is rigid.

4. The method of claim 1 wherein said maintaining step further comprises, pivoting said baffle during said coiling.

5. The method of claim 1 wherein said maintaining step further comprises pivoting said baffle and a pair of subunits of said guide away from an axis of said film roll.

6. The method of claim 1 wherein said supply chamber is part of a camera frame assembly and said method further comprises placing a film cartridge in a take-up chamber of the camera frame assembly.

7. The method of claim 6 wherein said placing step further comprises opening a light-tight door of said film cartridge.

8. The method of claim 1 wherein said coiling further comprises curling a leading portion of said filmstrip into an initial coil and scrolling a main portion of said filmstrip over said initial coil, and said method further comprises the steps of introducing a roll starter into said roll chamber prior to said forming step, and removing s aid roll starter prior to said scrolling step.

9. The method of claim 1 wherein said film roll is subjected to a substantially constant or diminishing biasing force from said guide and said baffle during said coiling step.

10. A method for loading photographic film comprising the steps of:

placing a film cartridge in a take-up chamber of a camera frame assembly having a supply chamber and a take-up chamber, and an internal baffle pivotably mounted in said supply chamber;

extending a guide into said supply chamber;

transporting said filmstrip from said cartridge to said supply chamber;

curling a leading portion of said filmstrip into an initial coil between said guide and said baffle;

scrolling a main portion of said filmstrip over said initial coil;

during said scrolling, subjecting said main portion of said filmstrip to a substantially constant or diminishing frictional resistance from said guide and said baffle.

11. The method of claim 10 further comprising, prior to said curling, the step of extending a roll starter into said supply chamber and, prior to said scrolling, withdrawing said roll starter from said supply chamber.

12. Apparatus for loading photographic filmstrip into a film holder having a supply chamber and an internal baffle pivotably mounted in said supply chamber, said apparatus comprising a receiver defining a site for the film holder;

a transport delivering the filmstrip to the supply chamber of the film holder in said site;

a retractable guide interposable in said chamber in spaced relation to the baffle of the film holder;

a positioner connected to said guide and detectably connectable to said baffle, said positioner being disposed to move said guide and said baffle, in tandem, relative to an axis of said supply chamber.

13. The apparatus of claim 12 wherein said guide has at least two guide subunits, each said guide subunit extending separately into said supply chamber.

14. The apparatus of claim 13 wherein said positioner pivots said guide subunits and said baffle, in tandem, relative to said film roll axis.

15. The apparatus of claim 14 wherein said guide subunits are pivoted about axes external to said supply chamber.

16. The apparatus of claim 12 further comprising a roll starter movable into and out of said supply chamber independent of said guide.

17. The apparatus of claim 12 wherein said transport delivers said filmstrip from a film cartridge and said apparatus further comprises a cartridge mover adapted to place said cartridge in said film holder.

18. The apparatus of claim 12 wherein said cartridge mover has an active light lock opener and a vacuum gripper.

19. A camera frame assembly for use with a photographic filmstrip, said camera frame assembly comprising:

a frame having a supply chamber and a take-up chamber, said supply chamber having an outer wall and two opposed end walls joined to said outer wall, said walls defining a cylindrical film space and a film space axis within said supply chamber, said outer wall defining a throat extending substantially tangent to said film space;

a rigid internal baffle mounted to said end walls at said throat, said baffle being pivotable about an axis substantially parallel to said film space axis, said baffle having opposed inner and outer surfaces, said inner surface facing said film space, said inner surface being concave, said outer surface being substantially complementary in shape to a portion of said outer wall.

20. The camera frame assembly of claim 19 wherein said supply chamber is empty and said baffle is freely pivotable.

21. The camera frame assembly of claim 19 further comprising a film roll disposed in said supply chamber, said film roll biasing said baffle against said outer wall.

22. The camera frame assembly of claim 21 wherein said throat has a width dimension parallel to and larger than a diameter of said film space, and said baffle partially occludes said throat to a dimension smaller than said diameter of said film space to block clockspringing of said film roll.

23. The camera frame assembly of claim 21 wherein said supply chamber has a recess opposite said baffle, said recess being set back from said film roll.

\* \* \* \* \*